United States Patent [19]

Ackroff et al.

[11] Patent Number: 5,721,913
[45] Date of Patent: Feb. 24, 1998

[54] INTEGRATED ACTIVITY MANAGEMENT SYSTEM

[75] Inventors: John M. Ackroff, Highland Park, N.J.; Michael M. Cruzcosa, Irving, Tex.

[73] Assignee: Lucent Technologies Inc., Murray Hill, N.J.

[21] Appl. No.: 665,340

[22] Filed: Jun. 17, 1996

Related U.S. Application Data

[63] Continuation of Ser. No. 238,547, May 5, 1994, abandoned.

[51] Int. Cl.$^6$ .................................................... G06F 17/30
[52] U.S. Cl. ........................... 395/614; 395/611; 395/208; 395/202; 395/751; 395/667
[58] Field of Search ........................... 364/419; 395/611, 395/614, 208, 202, 751, 667

[56] References Cited

U.S. PATENT DOCUMENTS

| | | | |
|---|---|---|---|
| 5,089,970 | 2/1992 | Lee et al. | 364/468 |
| 5,208,748 | 5/1993 | Flores et al. | 395/751 |
| 5,216,603 | 6/1993 | Flores et al. | 364/419 |
| 5,301,105 | 4/1994 | Cummings, Jr. | 364/401 |
| 5,301,320 | 4/1994 | McAtee et al. | 395/650 |
| 5,310,997 | 5/1994 | Roach et al. | 364/401 |
| 5,321,610 | 6/1994 | Breslin | 364/401 |
| 5,406,475 | 4/1995 | Kouchi et al. | 364/401 |
| 5,418,961 | 5/1995 | Segal et al. | 395/700 |
| 5,421,015 | 5/1995 | Khoyi et al. | 395/650 |

OTHER PUBLICATIONS

Sameh Rabie et al., "Management of corporate communication networks in the OSI Environment." Globecom (IEEE Global Telecommunications Conference) 1991, pp. 39.61–39.6.8.

Sameh Rabie, Integrated network management: Technologies and implementation experience, Infocom (IEEE) Dec. 1995, pp. 7D.3.1–7D.3.8.

Burke et al., "the activity database: a catalyst for change in the contemporary organization.", IEEE, Dec. 1990, pp.145–149.

Ernst Siepmann, "a data management interface as part of the framework of an integrated VLSI–Design system.", IEEE, Dec. 1989; pp. 248–287.

Koulopoulos, Thomas M., "Workflow Changes Its Image," Computerworld, vol. 28, No. 9 Feb. 28, 1994, pp. 97, 100–102, 104–105.

Marshak, Ronni T., "Action Technologies'Workflow Products," Workgroup Computing Report: Applying Technology to Business Processes, vol. 16, No. 5, ISSN: 1057–8889, May 1993, Patricia Seybold Group, 1992.

Richardson, Mary Ann, "Workflow Management Software," DATAPRO Document Imaging Systems, 6020 Related Technologies, McGraw–Hill Inc., 1983, pp. 1–10.

*Primary Examiner*—Thomas G. Black
*Assistant Examiner*—Cheryl R. Lewis

[57] ABSTRACT

A system for managing workflow of specific types of activities includes a database and at least one computer workstation connected to an integrated activities management system. The integrated activities management system strictly controls the entry, routing and processing of attribute information associated with each of the activities to manage the execution of the activity. The integrated activities management system utilizes an information organization system to maintain attribute information concerning each activity in the form of data records consisting of linked data objects in the database. Each type of data object has associated control rules which govern the entry, routing and processing of its attribute information. The data objects in each data record are arranged in a hierarchical manner and including data objects from at least a first hierarchical level and an activity level. The first hierarchical level data object contains information common to activities of all types. The activity level data object contains attribute information common to only that type of activity. The use of the hierarchial arrangement and first hierarchical level data objects facilitates changes to the managing and tracking routines in an existing system, as well as modification of the system to manage new activities of similar or dissimilar types.

23 Claims, 10 Drawing Sheets

A = LINKED DATA OBJECTS
B = ATTRIBUTE INFORMATION

| | SUBSCRIBER TROUBLE TICKET 210 | | NETWORK TROUBLE TICKET 220 | | PURCHASE ORDER 230 | | SERVICE ORDER 240 | | SHIPPING ORDER 250 | |
|---|---|---|---|---|---|---|---|---|---|---|
| 205 → | A | B | A | B | A | B | A | B | A | B |
| | 101 | CREATED DATE/TIME, CLOSED DATE/TIME, ACTIVITY NO., STATUS | 101 | CREATED DATE/TIME, CLOSED DATE/TIME, ACTIVITY NO., STATUS | 101 | CREATED DATE/TIME, CLOSED DATE/TIME, ACTIVITY NO., STATUS | 101 | CREATED DATE/TIME, CLOSED DATE/TIME, ACTIVITY NO., STATUS | 101 | CREATED DATE/TIME, CLOSED DATE/TIME, ACTIVITY NO., STATUS |
| | 102 | TROUBLE TICKET NO., TROUBLE DESCRIPTION, DIAGNOSIS CODE, DIAGNOSIS DESCRIPTION | 102 | TROUBLE TICKET NO., TROUBLE DESCRIPTION, DIAGNOSIS CODE, DIAGNOSIS DESCRIPTION | 104 - | ORDER NO. | 104 - | ORDER NO. | 104 - | ORDER NO. |
| | 108 | SUBSCRIBER NAME/ADDRESS, RELATED NETWORK TROUBLE TICKET ← 216 | 106 | AFFECTED SUBSCRIBER LIST | 110 | SUPPLIER NAME/ADDRESS, ITEM DESCRIPTION, ITEM COUNT, RECEIVED DATE/TIME | 112 | SUBSCRIBER NAME, SUBSCRIBER TELEPHONE NO., SUBSCRIBER ACCT. NO., FEATURES TO BE ADDED, FEATURES TO BE DISCONTINUED | 114 | SHIPPER NAME/ADDRESS, DESTINATION ADDRESS, ITEM DESCRIPTION |

| PARENT DATA RECORD ACTIVITY NUMBER | CHILD OR CHILDREN DATA RECORD ACTIVITY NUMBER(S) |
|---|---|
| 126 | 215, 225 |
| 241 | 261, 668 |
| ⋮ | ⋮ |

FIG. 9

INTEGRATED ACTIVITY MANAGEMENT SYSTEM

This is a continuation of Ser. No. 08/238,547 filed on May 5, 1994 and now abandoned.

FIELD OF THE INVENTION

The invention relates generally to activity and workflow management systems. More specifically, the invention concerns an integrated activity management system which controls the entry, routing and processing of information associated with corresponding activities or tasks to be performed.

BACKGROUND OF THE INVENTION

The simplest and most prevalent method of communicating information between business organizations, or between departments of one business organization, has been the use of business forms. For example, purchase orders and invoices are commonly used business forms to notify suppliers to send goods, or for requesting payment. Standardized procedures have been implemented by most business firms to perform specific business tasks and operations, such as the processing of particular business forms. Certain standard procedures for business form generation, manipulation and processing have been implemented in computer-based processing systems.

Known software workflow management systems have automated particular aspects of existing business operations in managing the flow of information as it is processed, shared, manipulated and compiled amongst various departments within a business organization. An example of a workflow operation is a business' hiring process. Whenever an employment offer is made and accepted, information regarding such things as the new employee's payroll deductions, insurance benefits, photo identification, telephone number and office location may be collected, reviewed and routed to other departments for processing. Departments that process new employee information, such as the payroll, benefits, security and facilities management, each have their own operations to perform on the information according to predetermined procedures.

A workflow management system for the hiring process activity would facilitate the collection of the required information, route the information to the proper departments for processing, and insure that each of the departments follow the proper procedures in processing the provided information. Further details concerning this example workflow system and commercially available workflow management software products are provided in Richardson, Mary Ann, "Workflow Management Software", DATAPRO Report No. 6020, p. 1 (McGraw-Hill, Delran N.J. 1983).

Commercially available workflow management systems which provide structuring and managing of information based on human communications by explicitly defining the types of communications between participants are described in Marshak, Ronni T., "Action Technologies' Workflow Products", Workgroup Computing Report, Vol. 16, No. 5 (May 1993), and U.S. Pat. Nos. 5,208,748 and 5,216,603, which are hereby incorporated by reference.

Known workflow management systems are implemented for specific limited business operations and are not readily expandable to include management of two dissimilar, but related types of business tasks. For example, a workflow management system associated with a telephone network system which tracks reported troubles with subscriber service typically does not share information with an inventory management system that tracks the procurement and delivery of equipment needed to repair the causes of the reported troubles.

Current trouble tracking workflow management systems, at best, contain information concerning related purchase and/or shipping order reference numbers used in a separate inventory management system. An operator must manually refer back and forth between the trouble tracking and inventory systems to determine the state of repair of an unresolved subscriber service trouble and the anticipated receipt of equipment needed to resolve the problem. In a similar manner, attempts to coordinate the procurement and shipping activities with the repair activities involve manually referring back and forth between the systems. When the material arrives at its destination, the shipping order can be closed out in the inventory management system, and an operator must then manually enter the necessary information in the trouble tracking system to reflect that the equipment has arrived and that the repair work can now take place.

In addition, present workflow management systems and their associated databases are relatively inflexible and do not readily facilitate the incorporation of new routines to manage dissimilar, but related activities, such as the integration of reported trouble tracking and inventory management.

SUMMARY OF THE INVENTION

The present invention provides a system for managing activities comprising an integrated activities management system ("IAMS") connected to a database and at least one computer workstation. The IAMS controls the workflow associated with the performance of each task or activity by strictly controlling the entry, routing and processing of attribute information associated with the task or activity. Information concerning each activity is maintained as data records in the database. Each data record consists of specific types of linked data objects, wherein each data object possesses particular attribute information corresponding to the activity information. The IAMS utilizes an information organization system for arranging and linking the proper data objects to form the required type of data record to manage a particular activity.

The data objects in each data record are preferably arranged in a hierarchical manner. Each type of data object has associated control rules which govern the entry, routing and processing of its attribute information. Each data object in a record is from a different hierarchical level as defined by the information organization system. The combined attribute information of each of the data objects within each data record characterizes the attribute information of the corresponding activity. Each data record corresponding to each activity contains data objects from at least a first hierarchical level and an activity hierarchical level. The first hierarchical level data object contains information regarding attributes common to activities of all types. The activity hierarchical level preferably contains information regarding attributes common only to that type of activity.

In accordance with the present invention, the hierarchical arrangement and first hierarchical level data objects in the information organization system may be used to facilitate the management of a large number of dissimilar types of activities by a single IAMS. Such a system may be readily modified to change the existing managing and tracking routines or to incorporate new control routines to manage new activities of similar or dissimilar types.

BRIEF DESCRIPTION OF THE DRAWINGS

FIG. 4 is a chart listing the attribute information for each activity managed by the IAMS of FIG. 1;

FIG. 9 is a global data record attaching table which may be utilized by the IAMS of FIG. 1.

DETAILED DESCRIPTION

Figure 1:
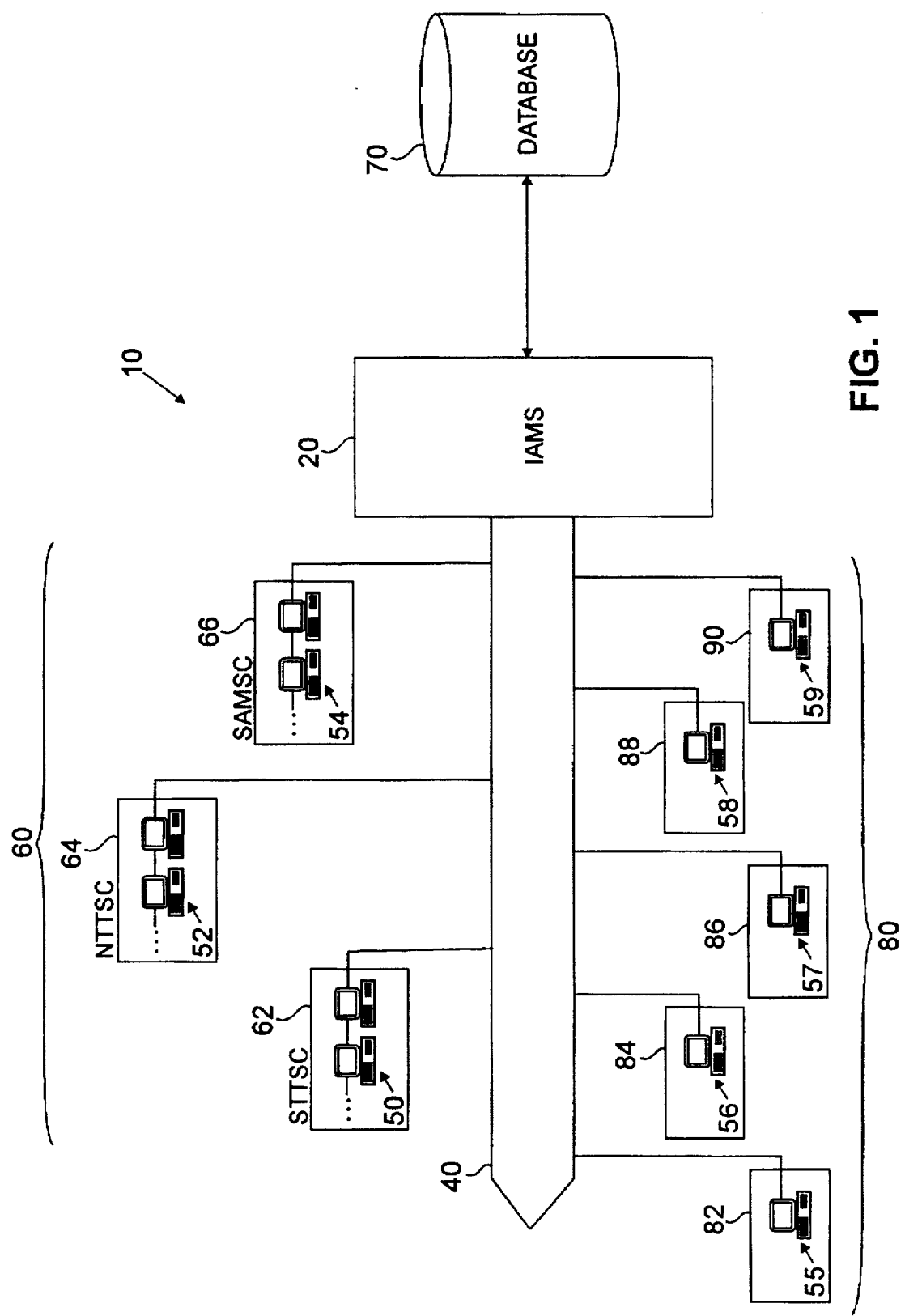
FIG. 1 is a telephone network support system utilizing an integrated activities management system (IAMS) according to the present invention.

FIG. 1 depicts a telephone network support system 10 utilizing an integrated activity management system (IAMS) 20 according to the present invention. The IAMS 20 controls and tracks activities or work flow performed in carrying out the functions of the telephone network support system 10. These activities include the work undertaken to resolve a reported or identified problem with a subscriber's telephone service or the delivery of ordered goods or services. The IAMS 20 is connected to a communications network 40 and a database 70. The communications network 40 is further connected to computer workstations 50, 52 and 54 located in an external service center or centers 60 and computer workstations 55, 56, 57, 58 and 59 in various departments 80, such as a service department 82, a technician group 84, a repair person group 86, a computer room 88 and a garage facility 90. The service centers shown in FIG. 1 include a subscriber trouble tracking service center (STTSC) 62, a network trouble tracking service center (NTTSC) 64 and a subscriber account management service center (SAMSC) 66.

Stationed within each of the service centers 62–66 are support personnel who operate the computer workstations 50–54 and communicate with subscribers and monitor electronic alarms (not shown). Suitable computer workstations for the computer workstations 50–59 include personal computers and computer terminals. Suitable networks for the communications network 40 include direct wiring, as well as any other suitable communication network well known in the art, such as ARCNET, Ethernet or token ring networks.

Figure 2:
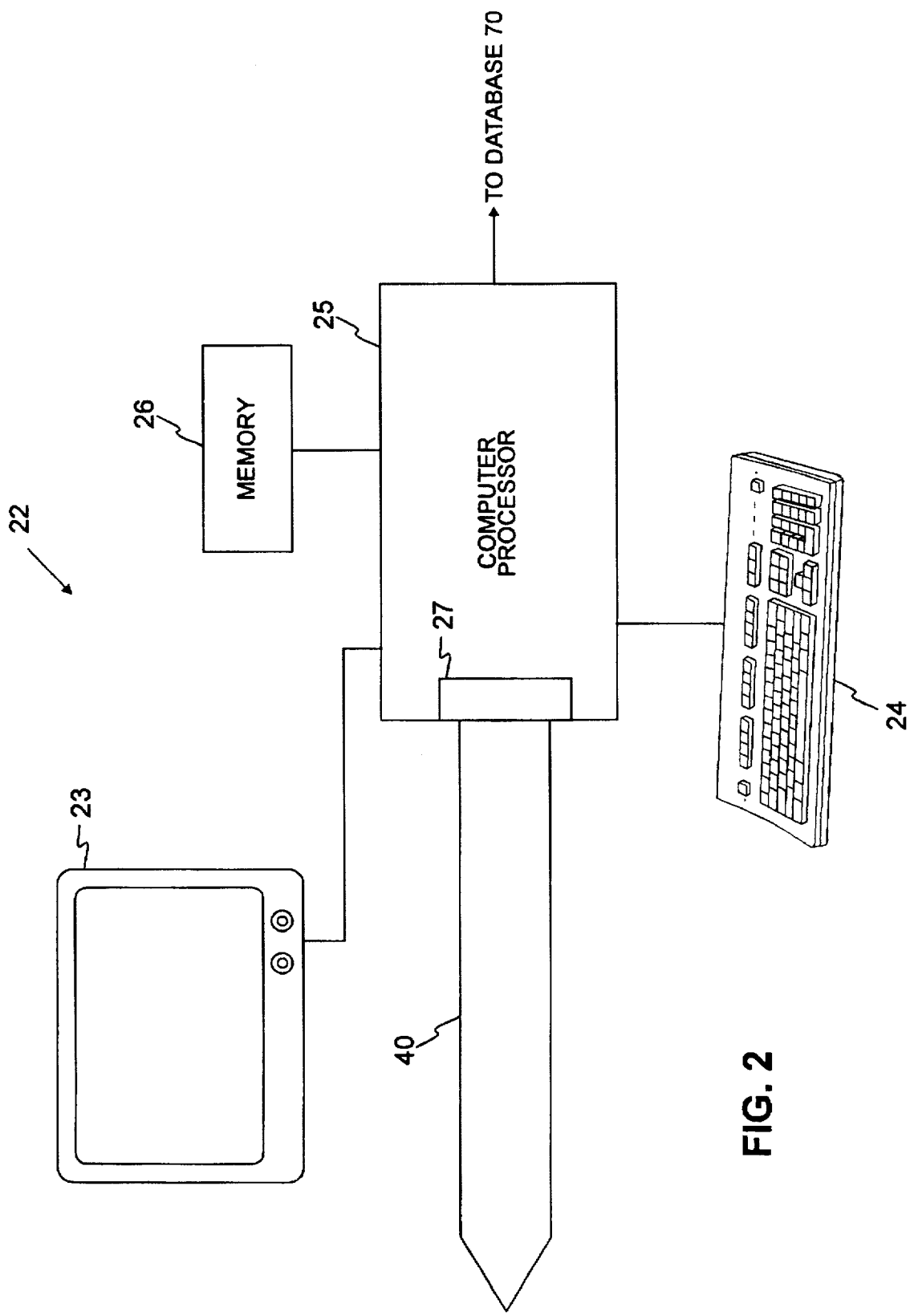
FIG. 2 is a suitable computer system which may be used for the IAMS of FIG. 1.

The IAMS 20 may be a programmed computer system such as the programmed computer system 22 shown in FIG. 2. In FIG. 2, the computer system 22 comprises an output device such as a computer display monitor 23, an input device such as a computer keyboard 24, a computer processor 25, and a memory unit 26. The computer processor 25 is connected to the output device 23, the memory unit 26, and the input device 24. The computer processor 25 is further connected to the database 70 of FIG. 1 and possesses a communications port 27 which is connected to the communications network 40 of FIG. 1. The memory unit 26 may be used for the storage of data and computer program code. The functions of the IAMS 20 are performed by the computer processor 25 by executing computer program code which is stored in the memory unit 26 or the database 70. The computer system 22 may suitably be any one of the types which are well known in the art such as a mainframe computer, a minicomputer, a workstation, or a personal computer.

The database 70 is preferably an object-oriented database. An object-oriented database is a specific type of database in which associated information is arranged in data records consisting of linked data objects. Data objects are data sets which contain specific attribute information, and which have pointers or other necessary information so that the data object may be connected or linked to other related data objects. In the alternative, the database 70 may use data tables that denote the linking arrangement of the data objects. Object-oriented databases are well known in the art and suitable object-oriented databases for the database 70 include commercially available databases from Sybase, Inc. of Emeryville, Calif., Informix Software, Inc. of Menlo Park, Calif., and Oracle Corporation of Redwood City, Calif. Information maintained in the database 70 may be physically distributed over one or more databases, however, to an operator of the IAMS 20, the information contained within the database 70 should appear to be part of a single database.. Alternatively, database 70 may be part of or located within the IAMS 20.

In operation, the IAMS 20 controls and tracks work to be performed, work in progress, and completed work, associated with performing the various business activities managed by the telephone network support system 10. The IAMS 20 controls and tracks activities by strictly managing the entry, processing and routing of specific information associated with each of the activities according to predetermined control rules. The depiction of the IAMS 20 in the telephone network support system 10 is for illustration purposes only. The present invention is intended to be utilized in any system having at least one computer workstation for the tracking of any type of work or activity and is not intended to be limited to the telephone network support system 10 shown in FIG. 1.

An example of an activity managed by the telephone network support system 10 is the work required to track and resolve a reported trouble with a subscriber's telephone services, such as "call waiting". Upon receiving a call from the subscriber reporting trouble, an operator at the STTSC 62 will create a subscriber trouble ticket in the IAMS 20 by entering various data into one of the computer workstations 50. Subscriber trouble tickets, or trouble tickets in general, are data records maintained in the database 70 by the IAMS 20 which are used to track, process and correct the reported trouble.

Once the subscriber trouble ticket data record is created in the database 70, the information contained therein may be routed to other operators of the IAMS 20, such as a technician in the technician group 84. After performing tests, the technician would enter the appropriate diagnosis of the trouble into the IAMS 20 to be included in the subscriber trouble ticket data record. The technician may enter the diagnosis information using the computer workstation 56. The IAMS 20 would then route the trouble ticket information including the diagnosis information to a repair person in the repair group 86 in order to repair the diagnosed fault. After completing the repair, the repair person would enter the corresponding repair information into the IAMS 20 using the workstation 57.

Trouble ticket data records may be closed when it has been verified that the trouble has been corrected. The specific information which may be maintained in the database 70 for subscriber trouble tickets is shown in a column 210 in FIG. 4 which is described below. The entry, routing and processing of the information associated with the subscriber trouble ticket data record is controlled by corresponding control rules which are discussed below with regard to FIG. 3.

A second example of an activity performed by the telephone network support system 10 is the work required to resolve trouble identified in a telephone switching network by electronic alarms or telephone network support personnel. The identified troubles are reported to the NTTSC 64 where an operator would create a network trouble ticket data record in the IAMS 20 by entering corresponding information in one of the computer workstations 52. The IAMS 20 would then route and process the information entered in order to initiate operations to resolve the identified trouble.

Three additional exemplary activities of the telephone network support system 20 of FIG. 1 include the entry, tracking and processing of purchase orders, service orders and shipping orders. For instance, when a subscriber wants to add a service to his telephone operation, such as "call waiting", he can call an operator at the SAMSC 66 who would enter the service order into the IAMS 20 using one of the computer workstations 54. The IAMS 20 would then route the necessary information to the proper service group to activate the requested service. Purchase orders and shipping orders are used for the procurement and shipping of goods, respectively.

Figure 3:
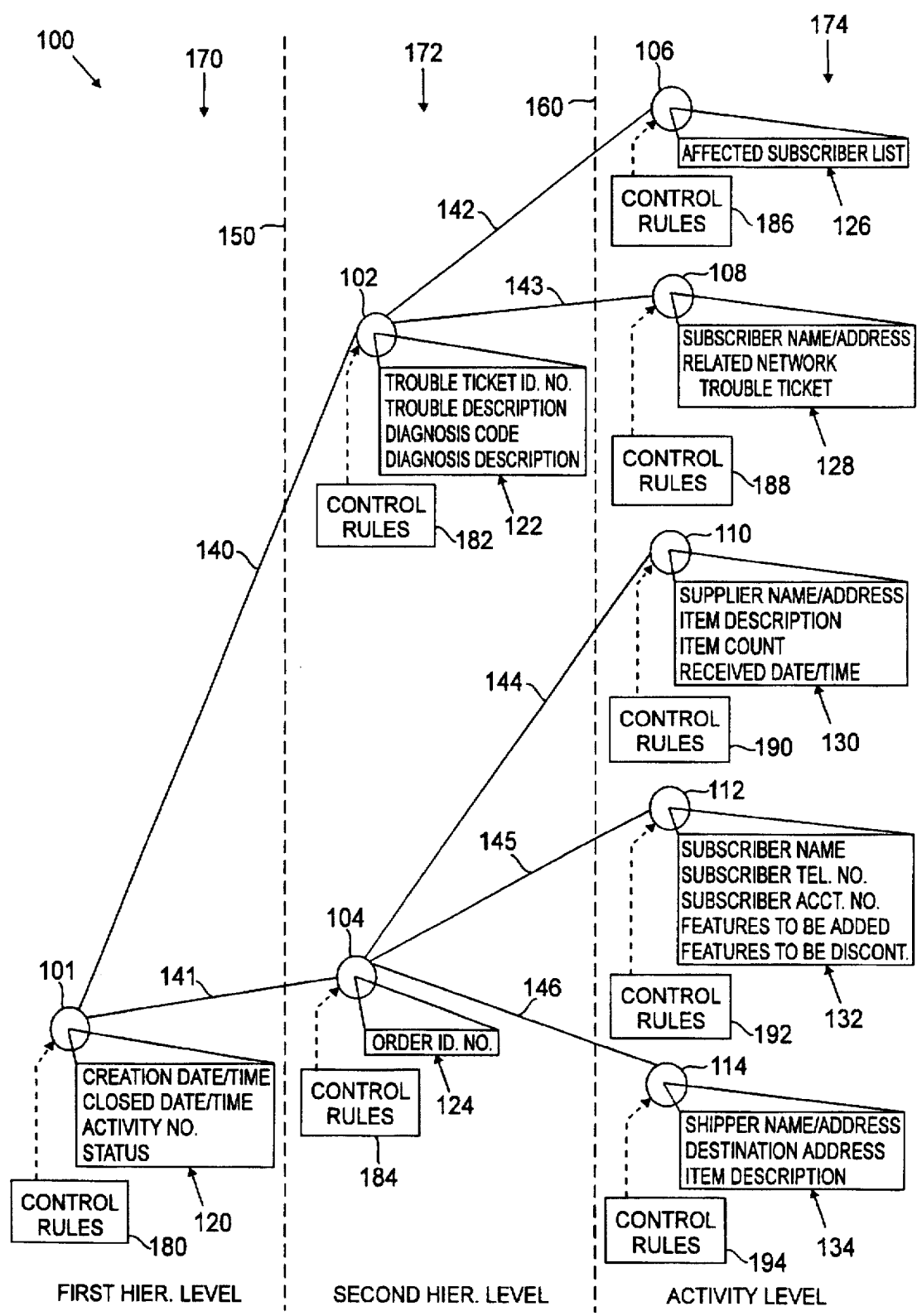
FIG. 3 is an information organization system used by the IAMS of FIG. 1 to organize data objects and associated attribute information in a database.

To achieve ease of system design and implementation of rule changes, the IAMS 20 arranges the data record information associated with each activity into specific data objects that are linked in a hierarchical manner in the database 70. FIG. 3 depicts an information organization system 100 used by the IAMS 20 for arranging data objects into five different types of data records in the database 70. The five different types of data records facilitate the management of the corresponding five types of activities of the telephone network support system 10 described above. Referring to FIG. 3, the information organization system 100 includes a work item data object 101 which may be linked to a trouble ticket data object 102 or an order data object 104 as represented by connection lines 140 and 141. The trouble ticket data object 102 may further be linked to a network trouble ticket data object 106 or a subscriber trouble ticket data object 108 as shown by connection lines 142 and 143. In a similar manner, the order data object 104 may be linked to a purchase order data object 110, a service order data object 112 and a shipping order data object 114 as shown by connection lines 144, 145 and 146, respectively.

Each of the data objects 101-114 within the information organization system 100 possess specific attribute information 120, 122, 124, 126, 128, 130, 132 and 134, respectively. For example, the attribute information 122 associated with the trouble ticket data object 102 is "trouble ticket identification number", "trouble description", "diagnosis code" and "diagnosis descriptionp".

The data objects 101-114 are further arranged into hierarchical levels as shown by dashed-lines 150 and 160, such that a first hierarchical level 170 contains the data object 101, a second hierarchical level 172 contains the data objects 102 and 104, and a third hierarchical level or activity level 174 contains the data objects 106-114. Control rules 180, 182, 184, 186, 188, 190, 192 and 194 govern the entry, routing and processing of the respective attribute information 120-134 in the data objects 101-114. Each one of the control rules 180-194 is unique to each type of corresponding data object 101-114 and may be stored in the database 70 or in another memory device associated with the IAMS 20, such as the memory device 26 of FIG. 2.

The relationships of certain data objects within the information organization system 100 may be regarded as belonging to particular classification groups. The data objects which may be linked to one type of data object on a higher hierarchical level may be considered to be part of a classification group. For example, the network and subscriber trouble ticket data objects 106 and 108 may be regarded as being in the same classification group because either one may be linked to the same higher level trouble ticket data object 102. In a similar manner, the three specific order data objects 110, 112 and 114 may be considered as part of the same classification group because each one may link to an order data object 104.

In order to manage and track an activity, the IAMS 20 must create a data record or set of corresponding linked data objects in the database 70 in accordance with the information arrangement system 100 shown in FIG. 3. A data record must include a data object from each hierarchical level for the respective activity. The connection lines 140-146 indicate the proper linking between data objects 101-114. For example, the necessary data objects to form the proper data record to manage each one of the five types of activities of the telephone network support system 10 is as follows:

| Activity | Data Object Set | Connection Lines |
| --- | --- | --- |
| Subscriber trouble ticket: | 101, 102, 106 | 140, 142 |
| Network trouble ticket: | 101, 102, 108 | 140, 143 |
| Purchase order: | 101, 104, 110 | 141, 144 |
| Service order: | 101, 104, 112 | 141, 145 |
| Shipping order: | 101, 104, 114 | 141, 146 |

An advantage of organizing activity information in an object-oriented manner is the relationship that exists between linked data objects and associated control rules. Data objects inherit the attribute information from the corresponding linked data objects of a higher hierarchical levels. Therefore, a data object of a lower hierarchical level may be referred to as a descendant of a linked data object of higher hierarchical level because it inherits the attribute information from its associated higher hierarchical level data objects. The IAMS 20 utilizes the inheritance characteristics of a linked set of data objects in a data record to manage an activity according to the corresponding information control rules. The hierarchical nature or linking configuration of the data objects in the database 70 should be transparent to the operator. This transparency may be accomplished by utilizing programming techniques well known in the art.

An example of the information maintained in a data record in the database 70 which is used to manage a shipping order would be the attribute information 120, 124 and 134 of the work item data object 101, the order data object 104 and the shipping order data object 114. Therefore, for this example, the complete set of attribute information utilized to manage the shipping order would be "creation date/time", "closed date/time", "activity number", "status", "order identification number", "shipper name/address", "destination address"0 and "item description".

A listing of the attribute information and corresponding set of data objects utilized in data records that manage the five types of activities of the telephone network support system 10 is shown in a chart 200 in FIG. 4. Each one of the activities is listed in a row 205. Listed below each activity in columns 210, 220, 230, 240 and 250 are the necessary linked data objects and attribute information to form the corresponding type of data record. The reference numbers of the necessary linked data objects are listed in subcolumns identified by an "A" and the corresponding attribute information is listed in subcolumns identified by a "B" for each type of data record.

The attribute information in each of the subcolumns "B" is necessary to track and control a corresponding activity of the type listed above in the row 205. For example, the attribute information required to track a subscriber trouble ticket data record is shown in a subcolumn 216 and the corresponding reference numbers of data object types which must be linked in the respective data record are listed in a subcolumn 213. Thus, a data record created to manage and track a subscriber reported trouble includes the set of linked data objects 101, 102 and 108 containing the attribute information "created date/time", "closed date/time", "activity number", "status", "trouble ticket number", "trouble description", "diagnosis code", "diagnosis description", "subscriber name/address", and "related network trouble ticket". In a similar manner, the attribute information and linked data objects required to manage and track the disposition of a network trouble ticket, purchase order, service order and shipping order are shown in the columns 220, 230, 240 and 250, respectively.

Figure 5:
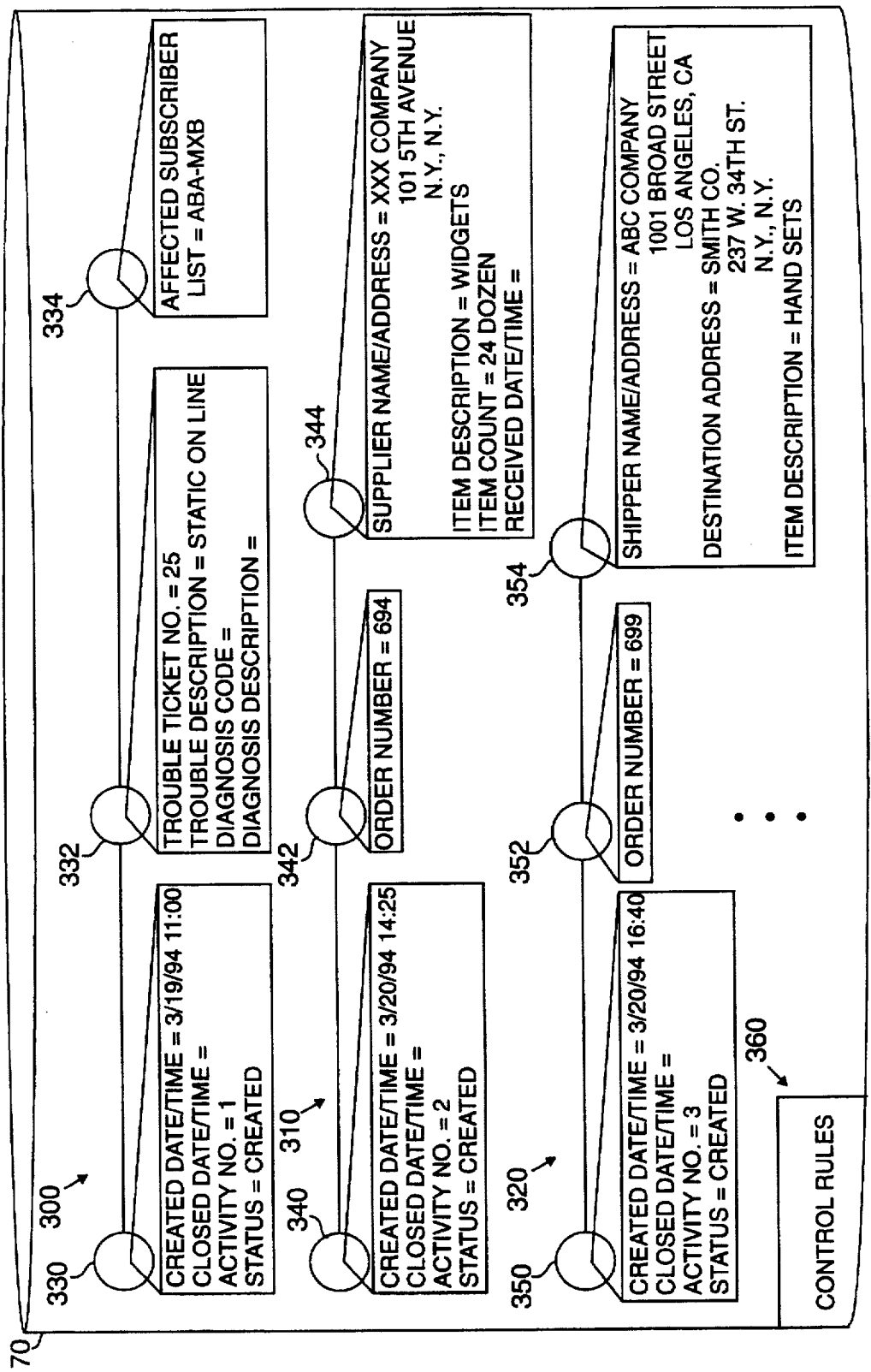
FIG. 5 is an arrangement of example data records in the database of FIG. 1.

An exemplary arrangement of three data records 300, 310 and 320 which may be contained within the database 70 to track three corresponding activities is shown in FIG. 5. The three data records 300, 310 and 320 correspond to a network trouble ticket, a purchase order, and a shipping order, respectively. Each one of the data records 300-320 contains a data object from each one of the hierarchical levels 170, 172, and 174 of FIG. 3. For example, the data record 300 regarding the network trouble ticket comprises data objects 330, 332 and 334 which correspond to the data objects 101, 102 and 106 of the information organization system 100 of FIG. 3. Likewise, the data records 310 and 320 for the purchase and shipping orders consist of data objects 340, 342 and 344, and 350, 352 and 354, respectively, which correspond to the data objects 101, 104 and 110, and 101, 104, 114, of FIG. 3, respectively.

The control rules 180-194 of the information organization system 100 of FIG. 3 may be contained within an area 360 of the database 70 as illustrated in FIG. 5 to control the entry, routing and processing of the corresponding attribute information of the data objects 330-354. The specific control rules of the control rules 180-194 that will be applied to each of the data objects 330-354 are based on the corresponding type of each data object, and have not been shown in FIG. 5 for ease of illustration. For example, if data object 342 in the set of data objects 310 is an order data object, such as the order data object 104 of FIG. 3, then the control rules 184 will be used to govern the entry, routing and processing of its attribute information. Similarly, the control rules 180, 182, 184, 186, 190 and 194, of FIG. 3 will govern the entry, routing and processing of the attribute information of the other data objects 330-354 shown in FIG. 5.

The control rules 180-194 may be maintained in a hierarchical fashion in the area 360 of the database 70. The hierarchical arrangement of the control rules 180-194 may be similar in arrangement to that of the data objects 101-114 in the information organization system 100. Each one of the control rules 180-194 controls a respective type of data object as shown in FIG. 3. Thus, if a fourth data record for another shipping order were added to the database 70 of FIG. 5, the corresponding control rules that would apply to the corresponding data objects would be the same control rules 180, 184 and 194 that apply to the shipping order data record 320. The control rules 180-194 are not created or destroyed with creation or closing of data objects.

Due to the inheritance of the linked data objects in the data records 300, 310 and 320, an operator of the IAMS 20 examining the information associated with the corresponding activities in the database 70 of FIG. 5 would see a display such as the following:

| | |
|---|---|
| Activity No. = | 1 |
| Activity Type = | network trouble ticket |
| Created Date/Time = | 3/19/94 11:00 |
| Closed Date/Time = | |
| Status = | Created |
| Trouble Ticket No. = | 25 |
| Trouble description = | improper connections |
| Diagnosis Code = | AMS |
| Diagnosis Description = | malfunctioning switch |
| Affected Subscriber List = | ABA - MDB |
| Activity No. = | 2 |
| Activity Type = | purchase order |
| Created Date/Time = | 3/20/94 14:25 |
| Closed Date/Time = | |
| Status = | Created |
| Order No. = | 694 |
| Supplier Name/Address = | XXX Co. |
| | 101 Fifth Avenue |
| | New York, New York |
| Activity No. = | 3 |
| Activity Type = | shipping order |
| Created Date/Time = | 3/20/94 16:40 |
| Closed Date/Time = | |
| Status = | Created |
| Order No. = | 699 |
| Shipper Name/Address = | ABC Co. |
| | 1001 Broad Street |
| | Los Angeles, CA |
| Destination Name/Address = | Smith Co. |
| | 237 W. 34th Street |
| | New York, New York |
| Item Description = | 12 handsets |

An efficiency is achieved in the design, development, and maintenance of programming code for an integrated activity management system utilizing the information organization system of the present invention. Specific types of attribute information which are common to two different types of activities within a classification group may be maintained on a corresponding higher hierarchical level data object. For example, the information for a "trouble ticket identification number" is common between the subscriber and network trouble tickets, and therefore, may be maintained within the second hierarchical level data object 102. The first hierarchical level data object 101 is reserved for attribute information 120 that is common to all activities whether of similar or dissimilar types.

As a consequence, to expand the capabilities of the information organization system 100 to maintain information concerning how subscriber and network troubles are resolved, a "resolution code" attribute need only be added to the attribute information 122 of the trouble ticket data object 102. The corresponding control rules 182 would also have to be updated to accommodate the new resolution code information. Thus, the attribute information for two types of activities would have been changed by making a single change to the attribute information 122 of the trouble ticket data object 102 and its associated control rules 182. The activity level data objects 106 and 108 for subscriber trouble tickets and network trouble tickets need to be altered only if there are attribute information or rule changes specific to either one of those types of trouble tickets. As a result, there is less programming code to design and write in implementing and maintaining common attribute information in the information organization system 100 than in conventional workflow management systems.

Although FIGS. 3-5 depict a method of organizing information that has three hierarchical levels, it is readily apparent to those skilled in the art that data records possessing data objects from more than three levels may be utilized according to the present invention. An IAMS 20 that manages activities by utilizing four levels of data object hierarchy is shown in FIG. 6 and is described below.

The hierarchical method of organizing activity information provides a further advantage in minimizing the design, development and maintenance needed to track new types of activities incorporated into an existing IAMS 20. The manner by which the information organization system 100 of FIG. 3 may be readily expanded to manage new types of maintenance activities is illustrated in FIGS. 6 and 7.

Figure 6:
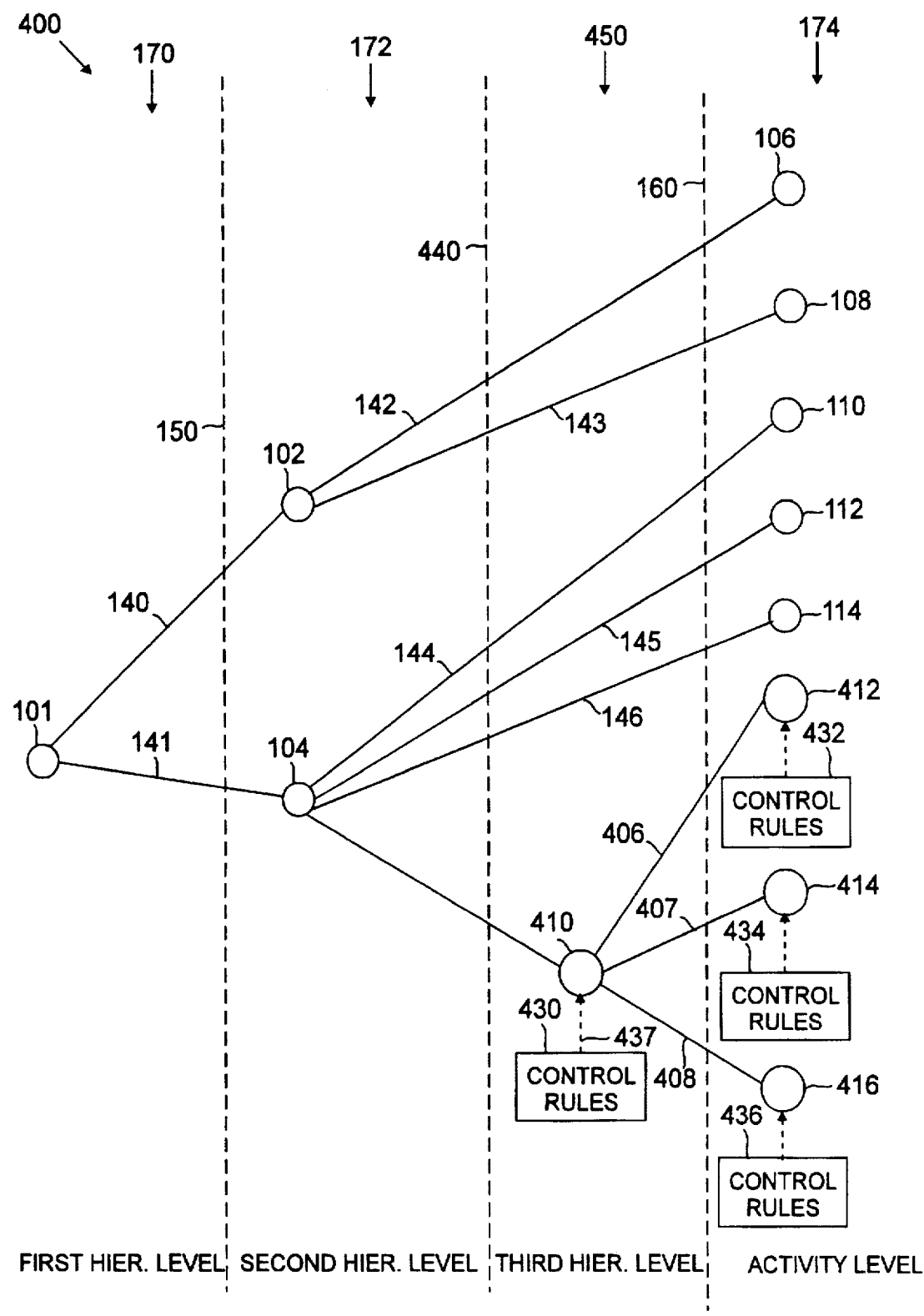
FIG. 6 is the information organization system of FIG. 3 modified to additionally manage particular work order activities.
Figure 7:
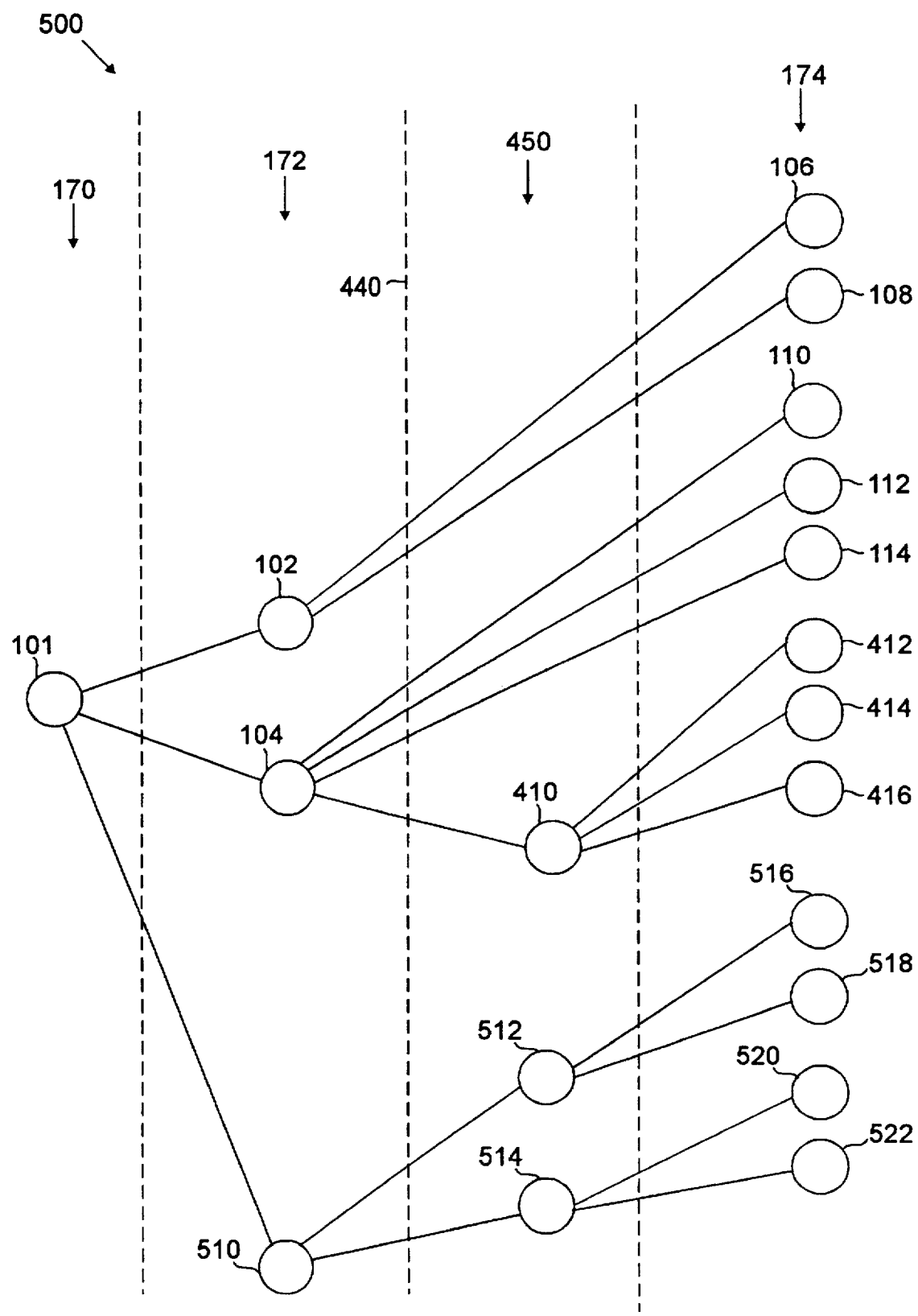
FIG. 7 is the information organization system of FIG. 6 modified to additionally manage specific maintenance operations.

In FIG. 6, an information organization system 400 manages all the types of activities managed by the system 100 of FIG. 3 as well as an install equipment work order, a replace equipment work order and a recover equipment work order. Similar components of FIGS. 3 and 6 are like numbered for clarity, such as the work item data object 101, the connection link 141 and the order data object 104. The data objects 101-114 of FIG. 6 may be linked to one another in a similar manner as that shown in FIG. 3. The attribute information 120-134 and associated control rules 180-194 of FIG. 3 exist in the information organization system 400 of FIG. 6, but have not been shown for ease of illustration.

In FIG. 6, the order data object 104 may be linked to the data objects 110-114 as well as a work order data object 410. The work order data object 410 possess attribute information common to the three new work order activities which is not common to the other preexisting order activities, i.e., purchase, service and shipping order activities. The work order data object 410 may be further linked to an install equipment work order data object 412, a replace equipment work order data object 414 or a recover equipment work order data object 416, as shown by connection lines 406, 407 and 408, respectively. The data objects 101, 104 and 410-416 contain respective attribute information corresponding to the install equipment work order, the replace equipment work order and the recover equipment work order.

The attribute information of the data objects 410-416 has not been shown in FIG. 6 for ease of illustration. The entry, routing and processing of the attribute information of the data objects 410-416 is controlled by corresponding control rules 430, 432, 434 and 436. Therefore, by simply adding four new types of data objects 410-416 and their associated control rules 430-436 the capabilities of the information organization system 100 of FIG. 3 have been expanded to process three new types of work orders.

The information organization system 400 utilizes four levels of hierarchy, as shown by dashed lines 150, 160 and 440. The data records corresponding to the three new types of work orders would contain the work order data object 410 which is represented on a new third hierarchical level 450. The new third hierarchial level 450 is positioned between the second hierarchical level 172 and the activity data object level 174. The preexisting trouble ticket, purchase order, service order and shipping order data records are still implemented in the three levels of hierarchy 170, 172 and 174 despite the fact that the new work order data record utilizes four levels of hierarchy. The present invention may utilize any number of hierarchical levels as required for each activity to organize a like number of levels of attribute information commonality.

A significant feature of the present invention is the inclusion of the first hierarchical level work item data object 101 in each data record. The advantage of this feature is an ability to manage dissimilar types of activities, whether related or otherwise, with a single IAMS 20. This advantage is illustrated in an information organization system 500 of FIG. 7 which is similar to the organization system 400 of FIG. 6, but which has been further modified to track and manage computer room and garage maintenance activities. In FIG. 7, data objects and connection lines similar to those of FIG. 6 are like numbered. The associated control rules and attribute information shown in FIGS. 3 and 6 exist in the information organization system 500 of FIG. 7, but have not been shown for ease of illustration.

Data objects 101-114 and 410-416 of FIG. 7 are capable of operating in substantially the same way and contain substantially similar attribute information as the information organization system 400 of FIG. 6. The work item data object 101 of FIG. 7 may be linked to the trouble ticket and order data objects 102 and 104, as well as a new maintenance task data object 510. The maintenance task data object 510 may further be linked to either one of computer room maintenance or garage maintenance data objects 512 and 514. The computer room maintenance data object 512 may be linked to a backup files data object 516 or a change filter data object 518. Similarly, the garage maintenance work object 514 is capable of connecting to either of an oil maintenance data object 520 or a tire maintenance data object 522.

In operation, the use of the information organization system 500 by the IAMS 20 facilitates the management and control of a large assortment of activities including the activities controlled by the information organization systems 100 and 400, as well as the activities of the computer room 88 and the garage facility 90. The activities in the computer room 88 which may be managed according to the information organization system 500 include the backup of computer files and the changing of air filters. The activities of the garage facility 90 which may be initiated and managed by the IAMS 20 include oil changes and tire maintenance of vehicles.

As the information organization system 500 demonstrates, the IAMS 20 easily maintains and tracks a large assortment of activities having varying complexities. The information organization system 500 shown in FIG. 7 manages complex activities, such as diagnosing and resolving troubles in subscriber services, as well as simple scheduling activities, such as the changing of engine oil in the telephone company's vehicles. The information organization system 500 further demonstrates the flexibility of the present invention to readily expand to incorporate management of new dissimilar activities. Such expansion can be developed and implemented with minimal modification required.

Another feature of the present invention is the ability to associate or attach two data records in the database 70 which correspond to two related activities. Two data records may be attached to one another when the completion of a corresponding activity to one of the sets is dependent on the completion of the activity characterized by the other set of data objects. Techniques for attaching related data records in the database 70 include the incorporation of attribute information in one of the data objects of the data records which indicates the activity number of any attached data records.

Figure 8:
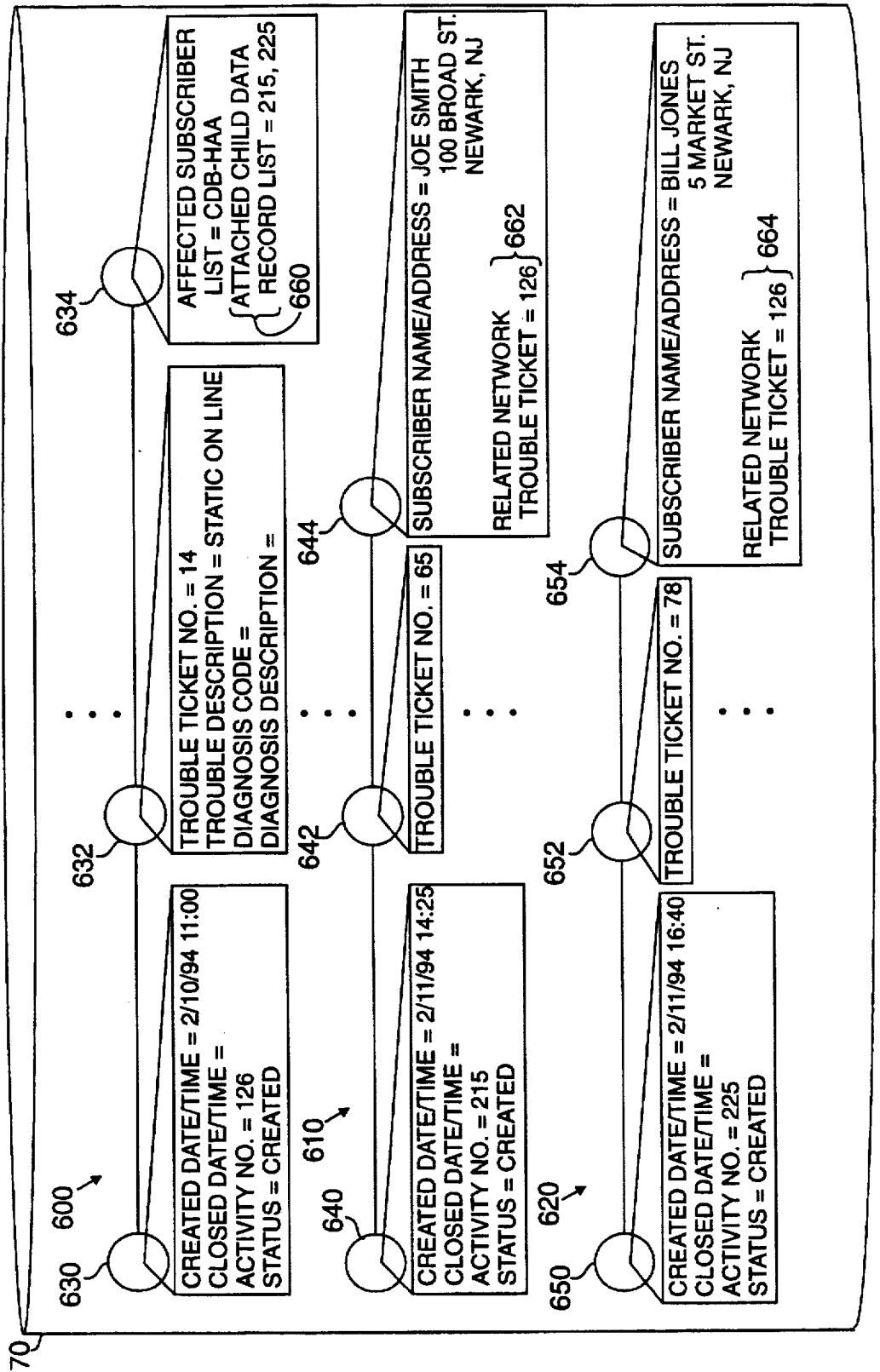
FIG. 8 is an example of one suitable arrangement of attached data records in the database of FIG. 1.

FIG. 8 depicts an example of three attached data records 600, 610 and 620 in the database 70. The data record 600 is for managing a network trouble ticket and consists of linked data objects 630, 632 and 634, which correspond to the work item data objects 101, 102 and 106 of the information organization system 100 of FIG. 3. A new "attached child data records" attribute 660 has been added to the network trouble ticket data object 634. The data records 610 and 620 are subscriber trouble ticket data records and contain linked data objects 640, 642 and 644, and 650, 652 and 654, respectively, which correspond to the respective data objects 101, 102 and 108 of FIG. 3.

Attached data records may be regarded as having a parent-child relationship. For instance, the network trouble ticket data record 600 may have been created in response to an automatic alarm generated in the telephone network support system 10 upon a telephone network outage. As subscribers call in to report service outages, subscriber trouble ticket data records, such as data records 610 and 620, would be created by an operator in the STTSC 62 and attached as children to the previously created parent network trouble ticket data record 600. The subscriber trouble ticket data records 610 and 620 are attached to the network trouble ticket data record 600 by the entry of the activity number "126" of the data record 600 in the "related network ticket" attribute information 662 and 664 of the data records 610 and 620. Correspondingly, the entries in the "attached child data record list" attribute 660 of the data record 600 are the activity numbers "215" and "225" of the attached data records 610 and 620. As a consequence, the ability to attach two particular types of data records to one another may be controlled in the corresponding control rules, such as control rules 186 and 188 for the network and subscriber data objects, respectively.

Figure 9:
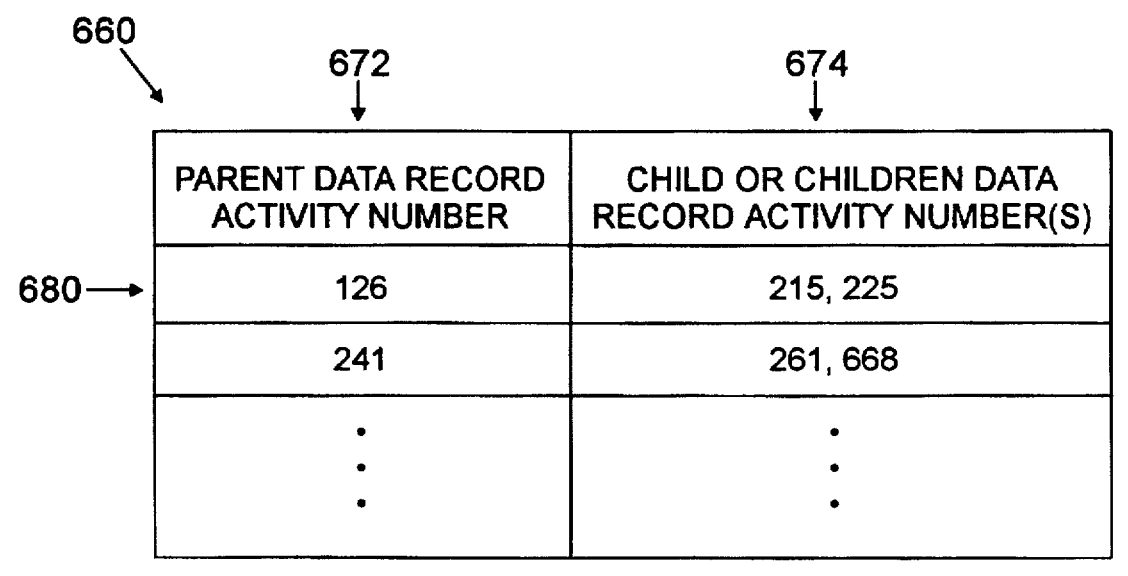

An alternative technique for implementing the attachment of documents is to use a global data record attaching table which may be contained in the database 70. A suitable global data record attaching table 660 is shown in FIG. 9. In FIG. 9, the activity number of parent data records of any attached data records are maintained in a column 672 and the corresponding child data objects are maintained in a column 674.

The attachment of the data records 600, 610 and 620 shown in FIG. 8, is depicted in a row 680 of the table 660. The activity number of the parent record in row 680 is "126" and the corresponding child activity numbers are 215 and 225. In operation, the control rules can execute routines which query or update the table 660 in operating with attached data records. If a global data record table is used, the network and subscriber trouble ticket data objects need not contain the attribute information for "attached child data records" or "related network trouble tickets", respectively, as this information is provided in the global data record attaching table.

An efficiency is achieved by attaching data records corresponding to related activities. More specifically, in the example above, a technician who sees one of the child subscriber trouble ticket data records 610 or 620 would know that the actual trouble is being tracked by the parent network trouble ticket data record 600. Thus, the technician would know not to spend time testing or diagnosing the trouble reported by the child subscriber trouble ticket data record because this work would be done in the processing of the parent trouble ticket data record 600.

Control rules can be written to account for parent/child relationships. For example, the portion of the control rules of the network trouble ticket data object 106 for diagnosing a trouble may contain rules that provide that if the trouble ticket is a parent, the diagnosis is "passed down" to its children data records. This allows each related subscriber and network trouble ticket data record to contain all the necessary information without requiring the technician to enter the information for each child data record individually.

In the above example, attaching of data records permits managers to make a distinction between the number of trouble reports and the actual number of troubles. As a result, managers will be better able to make staffing decisions when there is an unusually large number of reported troubles because they will be able to recognize the instances when the actual number of troubles is less than the number of reported subscriber troubles.

Alternatively, the parent data record may depend on its child data records for updating attribute information. For instance, an order to install a particular type of service may be dependent on material being shipped to the service location and other work being done on a piece of equipment within the network. In such a case, there are rules associated with the child shipping and work order data records that cause them to pass certain information, such as changes in due dates or work completion information, up to their parent install equipment work order data record. In some cases, there may also be rules associated with the parent data record that are triggered by an update of attribute information of the parent data record caused by an attached child data record. For example, when a child shipping order data record notifies its parent service order data record that some material has reached a particular destination, the parent data record's control rules may create a new child install equipment work order data record which is used to cause someone to install the received equipment.

The use of first hierarchical level data objects and attaching permits true association and integration of dissimilar, but related work activities. Thus, the present invention eliminates the need of maintaining two workflow management systems, one system for each dissimilar activity, as well as the need to enter redundant information in two systems or the use of often unnecessarily complex interfacing routines.

Figure 10:
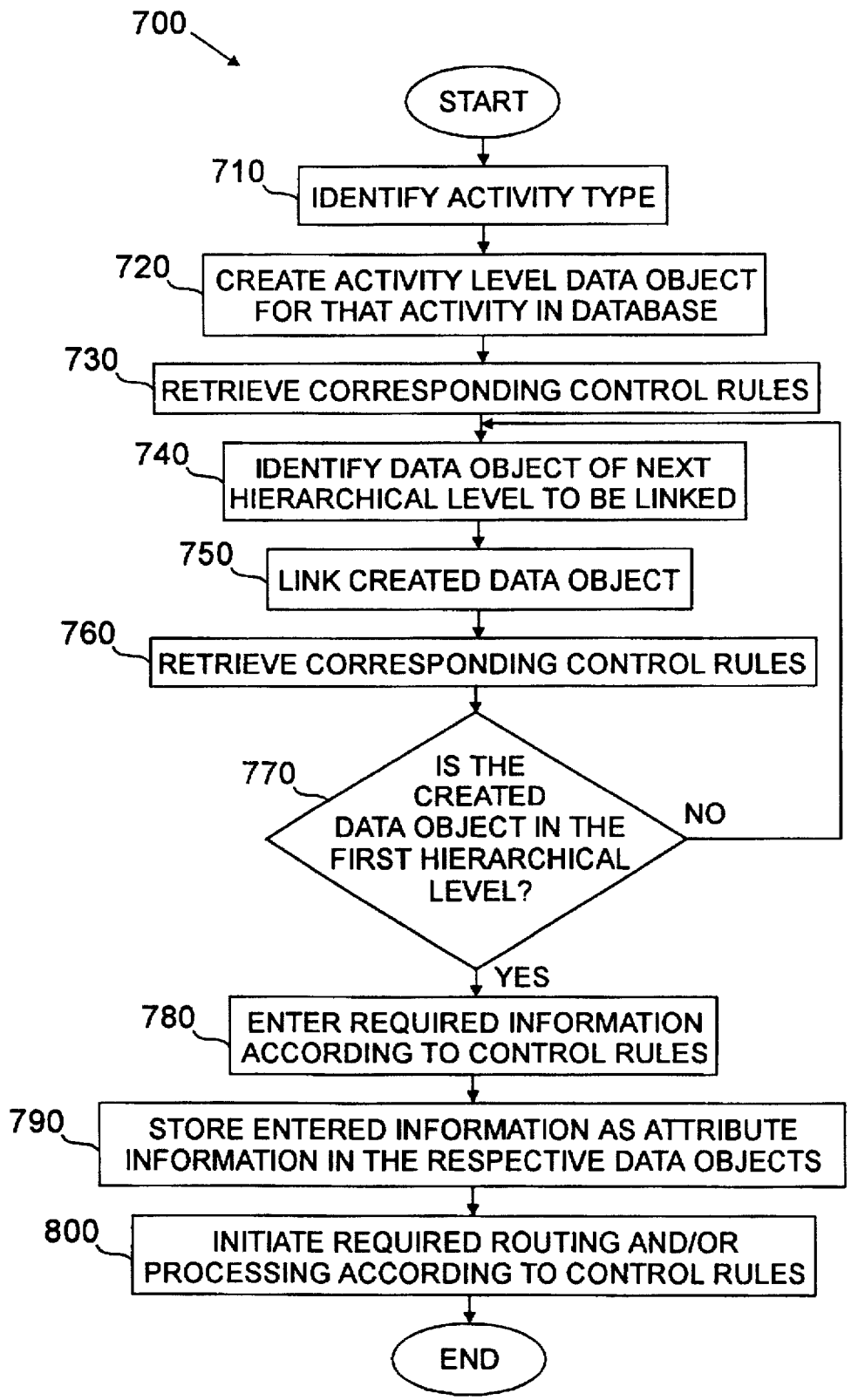
FIG. 10 is a flow diagram of a routine which may be used by the IAMS of FIG. 1 to create the necessary data record to control and manage a corresponding activity.

FIG. 10 depicts one method 700 which may be used by the IAMS 20 to create the linking of proper data object to form data records for respective activities in the database 70. Referring to FIG. 10, the method 700 first identifies the type of activity to be tracked in a step 710. The IAMS 20 may identify the type of activity by requiring the operator to enter the activity type at one of the computer workstations 50–59. The IAMS 20 then creates the corresponding activity level data object in the database 70 in a step 720. Then, in a step 730, the corresponding control rules for the activity level data object are retrieved. The control rules for the newly created data object may be located within the database 70 as shown in the area 360 of FIG. 5.

The method 700 then identifies and creates the data object of the next hierarchical level for the data record in the database 70 in a step 740. The identity of the next hierarchical level data object may be contained in the control rules corresponding to the previously created data object. The newly created data object is then linked to the previously created data object in step 750. Then in step 760, the control rules for the newly created and linked data object are then retrieved.

The IAMS 20 then determines, in step 770, whether the last created data object is in the first hierarchical level, such as level 170 of FIG. 3. If the IAMS 20 determines that the last created data object is not in the first hierarchical level, the IAMS 20 proceeds to the steps 740-760 so that the next respective hierarchical level data object is identified, created and linked to the previously created data object. However, if the IAMS 20 determines that the last created data object is in the first hierarchical level, the IAMS 20 would then proceed to step 780. By reaching the step 780, the IAMS 20 has created and linked all the required data objects including a first hierarchical level data object to form a data record which is capable of tracking an activity.

In the step 780, the required attribute information would be entered according to the set of retrieved control rules. Certain attribute information may be entered by an operator and other attribute information may be generated by the IAMS 20. The entered and generated attribute information, is then stored within the respective created data objects in the database 70 in a step 790. After storing the attribute information, the IAMS 20 would initiate the required information routing and processing routines according to the associated control rules in a step 800. As a result, the required information regarding an activity would be entered in the IAMS 20 according to an information organized system of the present invention. The IAMS 20 may then manage the execution of the operations of that activity.

In managing and tracking an activity, the IAMS 20 may route the corresponding data record or a portion of its attribute information to specific telephone company departments associated with the telephone network support system 10 for processing or performance of a task. A data record or a portion of its attribute information may be routed based on the value of one or more attributes. For instance, a data record for a subscriber trouble ticket may be routed based on the value of its work item data object 101 status attribute which may include: "created" when the subscriber trouble ticket data record has been created in response to a reported trouble; "diagnosed" after a technician has analyzed the trouble and identified its cause; "repaired" after a repair person has repaired the cause of the reported trouble; and "restored" after a supervisor has reviewed the repair and confirmed that the subscriber's service is operating normally.

There are various types of information routing methods which may be utilized by the IAMS 20 to route the created data record information to the technician group 84, the data record having a "diagnosed" status to the repairperson group 86, and the data record having a "repaired" status to the supervisor. One type of routing method utilizes particular network routing software programs which are executed by the corresponding control rules associated with a subscriber trouble ticket data record. Various network routing programs and techniques well known in the art are suitable for use in the IAMS 20, and the selection of an appropriate network routing program may be routinely made based upon the discussion herein once the desired overall system parameters are known.

The specific network routing software program that is executed is based on the status information the corresponding work item data object 101 of the data record. For example, if the status attribute information of a data record is "created", the associated control rules would execute the network routing software program which transmits the data record or a portion of its attribute information over the communications network 40 to the computer workstation 56 of the technician group 84.

Another type of routing method requires that each group execute database queries of the database 70 over the communication network 40 to identify those data records upon which the group must operate. For example, a person in the repairperson group 86 may periodically execute a query from his computer workstation 57 to identify those subscriber or network trouble ticket data records in the database 70 whose status is "diagnosed" to identify the subscribers' service troubles which have been diagnosed and are in need of repair.

Yet another type of routing method utilizes the control rules to execute a software routine to format the attribute information of a data record into a format suitable for facsimile transmission and to transmit such formatted information to the required group by facsimile. For example, if the status of a data record for a subscriber trouble ticket is "created", the associated control rules would format the required information into a suitable facsimile format and transmit the formatted information to the technician group 84 to alert the group of a subscriber trouble which needs to be diagnosed.

In the alternative, the software routine may create a data packet containing the necessary attribute information in a predetermined format. The routine would then transmit the data packet on the communications network 40 to a computer system in the group or department which needs to perform a task corresponding to that data record. The list of routing techniques described above is not exhaustive, and it is readily apparent to those skilled in the art that many other network routing techniques may be employed with the IAMS 20 of the present invention.

Although one embodiment of the integrated activities management system has been described in detail above with respect to a telephone network support system, it would be readily understood by those having ordinary skill in the art that many modifications are possible in the described embodiment without departing from the teachings of the present invention. All such modifications are intended to be encompassed by the claimed invention. For instance, other activities which may be managed by the integrated activities management system include management of analogous activities to those discussed above in the operations of public service utilities such as gas, electric, water and sewage utilities, as well as operations of cable television providers. The integrated activity management system may also be used to manage routine maintenance and quality assurance activities associated with a variety of transportation businesses, such as those businesses overseeing airplanes, trains or buses.

We claim:

1. A computer-based system for managing independent activities, said system comprising:

at least one computer workstation;

an integrated activities management system;

a communications network connecting said at least one computer workstation to said integrated activities management system: and a database connected to said integrated activities management system, the database containing attribute information in data records of at least two linked data objects concerning respective dependent activities, said data objects being of specific types with each of said types having particular attribute information of the data record, each of said types of data object having associated control rules governing processing of its attribute information, each of said data records containing said data objects from different hierarchical levels, of said data records including a data object of a first hierarchical level, and wherein at least one data record for a respective activity has a logical association with another data record corresponding to a related activity, wherein control rules at least one of said types of data objects cause the automatic processing of their attribute information for said at least one of said types of data objects based on an event occurring during one of said related activities.

2. The system of claim 1, wherein each data record remains data objects from at least the first hierarchical level and an activity hierarchical level, wherein the first hierarchical level data object contains information regarding attributes common to a plurality of types of activities and the activity level data object contains information regarding attributes common to a particular type of activity.

3. The system of claim 2, wherein said control rules are maintained in a hierarchical manner based on the hierarchical level of their corresponding type of data objects.

4. The system of claim 3, wherein the control rules are maintained in the database.

5. The system of claim 2, wherein the data records are logically associated by attribute information of a data object in one of the data records which contains a reference to a data object of the data record of the related activity.

6. The system of claim 1, wherein the related data records are identified in a data record association table.

7. The system of claim 6, wherein the data record association table is maintained in the database.

8. The system of claim 1, wherein the database is included in the integrated activities management system.

9. An integrated activities management system comprising:

a processor containing an information organization system;

at least one memory device connected to be processor; and a database contained within said at least one memory device, the database containing attribute information in data records of at least two linked data objects concerning respective independent activities, said data objects being of specific types with each of said types having particular attribute information of the data record, each of said types of data object having associated control rules governing of its attribute information, each of said data records containing said data objects from different hierarchical levels, each of said data records including a data object of a first hierarchical level, and wherein at least one data record for a respective activity has a logical association with another data record corresponding to a related activity, wherein control rules of at least one of said type of data objects cause the automatic processing of their attribute information for said at least one of said types of data objects based on an event occurring during one of said related activities.

10. The system of claim 9, wherein each data record contains data objects from at least the first hierarchical level and an activity hierarchical level, and wherein the first hierarchical level data object contains information regarding attributes common to a plurality of types of activities and the activity level data object contains information regarding attributes common to a particular type of activity.

11. The system of claim 9, wherein the data records are logically associated by attribute information of a data object in one of the data records which contains a reference to a data object of the data record of the related activity.

12. The system of claim 9, wherein the related data records are identified in a data record association table.

13. The system of claim 12, wherein the data record association table is maintained in the database.

14. The system of claim 9, wherein said control rules are maintained in a hierarchical manner based on the hierarchical level of their corresponding type of data objects.

15. The system of claim 14, wherien the control rules are maintained in the database.

16. A method of managing information regarding independent activities using an integrated activities management system comprising the steps of:

establishing an information database;

forming a data record fore respective independent activities by linking particular types of data objects, wherein the types of data objects being linked are dependent on the corresponding type of activity to be managed;

maintaining specific attribute information associated with each type of data object, wherein the attribute information of the linked data objects in a data record characterize the corresponding activity;

controlling an activity by controlling processing of the attribute information within each data record based on control rules;

selecting the data objects within each data record such that each data object is from a different hierarchial level, each of said data records including a data object of a first hierarchical level; and forming a logical association between data records for corresponding related activities, wherein control rules of at least one of said types of data objects cause the automatic processing or their attribute information for said at least one of said types of data objects based on an event occurring during one of said related activities.

17. The method of claim 16 further comprising the step of organizing the database wherein each data record contains data objects from at least the first hierarchical level and an activity hierarchical level, and wherein the first hierarchical level data object Contains information regarding attributes common to a plurality of types of activities and the activity level data object contains information regarding attributes common to a particular type of activity.

18. The method of claim 16 further comprising the step of arranging the control rules for each type of data object in a hierarchical manner based on the hierarchical arrangement of their corresponding type of data objects.

19. The method of claim 18 further comprising the step of maintaining the control rules in the database.

20. The method of claim 18 further comprising the step of maintaining the control rules in a memory unit associated with the integrated activities management system.

21. The method of claim 16, wherein the logical association of data records further comprises the step of maintaining attribute information in a data object in one of the data records which contains a reference to a data object of the data record of the related activity.

22. The method of claim 16, wherein the step of attaching data records further comprises the step of maintaining a data record association table containing identifiers of the associated data records.

23. The method of claim 22, wherein the data record association table in maintained in the database.

* * * * *